United States Patent [19]

Anderson et al.

[11] Patent Number: 5,720,907
[45] Date of Patent: Feb. 24, 1998

[54] METHOD FOR MANUFACTURING AN OPTICAL CONNECTOR ASSEMBLY

[75] Inventors: Jerry Max Anderson, Austell; Norman Roger Lampert, Norcross; George John Shevchuk, Old Bridge, all of Ga.

[73] Assignee: Lucent Technologies Inc., Murray Hill, N.J.

[21] Appl. No.: 428,804

[22] Filed: Apr. 24, 1995

[51] Int. Cl.$^6$ .................................................. B29D 11/00
[52] U.S. Cl. ................................. 264/1.25; 264/272.15; 264/275; 264/328.1; 425/116; 425/577; 425/468
[58] Field of Search .......................... 264/1.25, 272.15, 264/274, 275, 279, 279.1, 328.1; 425/116, 117, 468, 467, 577; 249/63, 64

[56] References Cited

U.S. PATENT DOCUMENTS

| | | | |
|---|---|---|---|
| 4,107,242 | 8/1978 | Runge | 264/1.25 |
| 4,173,389 | 11/1979 | Curtis . | |
| 4,213,932 | 7/1980 | Young | 264/236 |
| 4,264,128 | 4/1981 | Young . | |
| 4,292,260 | 9/1981 | Cheung . | |
| 4,383,964 | 5/1983 | Prus | 425/468 |
| 4,424,174 | 1/1984 | Howarth . | |
| 4,711,752 | 12/1987 | Deacon et al. | 264/1.25 |
| 4,737,009 | 4/1988 | Kakii et al. . | |
| 4,762,584 | 8/1988 | Andreason et al. | 264/274 |
| 4,834,487 | 5/1989 | Abendschein et al. . | |
| 4,934,785 | 6/1990 | Mathis et al. . | |
| 4,942,009 | 7/1990 | Ohshima | 264/1.25 |
| 5,013,495 | 5/1991 | Noba et al. | 264/275 |
| 5,016,970 | 5/1991 | Nagase et al. . | |
| 5,101,463 | 3/1992 | Cubukciyan et al. | 385/72 |
| 5,182,032 | 1/1993 | Dickie et al. | 425/116 |
| 5,216,733 | 6/1993 | Nagase et al. | 385/60 |
| 5,216,734 | 6/1993 | Grinderslev | 385/60 |
| 5,269,998 | 12/1993 | Takagi et al. | 264/328.1 |
| 5,307,431 | 4/1994 | Mehadji et al. | 385/72 |
| 5,375,183 | 12/1994 | Edwards et al. . | |
| 5,439,370 | 8/1995 | Lalaouna et al. | 425/468 |
| 5,482,451 | 1/1996 | Johnson et al. | 264/1.24 |

FOREIGN PATENT DOCUMENTS

| | | | |
|---|---|---|---|
| 0490541 | 6/1992 | European Pat. Off. . | |
| 60-179708 | 9/1985 | Japan | 264/1.25 |
| 62-47308 | 10/1987 | Japan . | |
| 2016022 | 1/1990 | Japan . | |

OTHER PUBLICATIONS

Optical Fiber Telecommunications II, 301–325 (Stewart E. Miller, et al. eds 1988).

*Primary Examiner*—Mathieu D. Vargot
*Attorney, Agent, or Firm*—Michael A. Morra

[57] ABSTRACT

A method and apparatus for manufacturing an optical connector subassembly provide an improved device at lower cost. The optical connector includes a plastic base member 150 which is overmolded onto a cylindrical ferrule 140 having an axial passageway 145 which extends from one end face 141 of the ferrule to the other 142. A mold 900 includes two parts 910, 960 which are joined together before heated and pressurized thermoplastic material is injected. The ferrule is held within a first channel 914 of the mold and a spring-loaded core pin 950 is held within a second channel 964 of the mold. These channels are coaxially aligned when the mold parts are joined together. The core pin includes a conical point 951 at one end which enters the axial passageway of the ferrule before the thermoplastic material is injected. A third channel 912, 962 receives the thermoplastic material and routes it into the first and second channels. Moreover, a brake 970 is applied to the core pin when thermoplastic material enters a fourth channel 913 so that the conical point will remain in contact with end face 141 of the ferrule during molding.

5 Claims, 6 Drawing Sheets

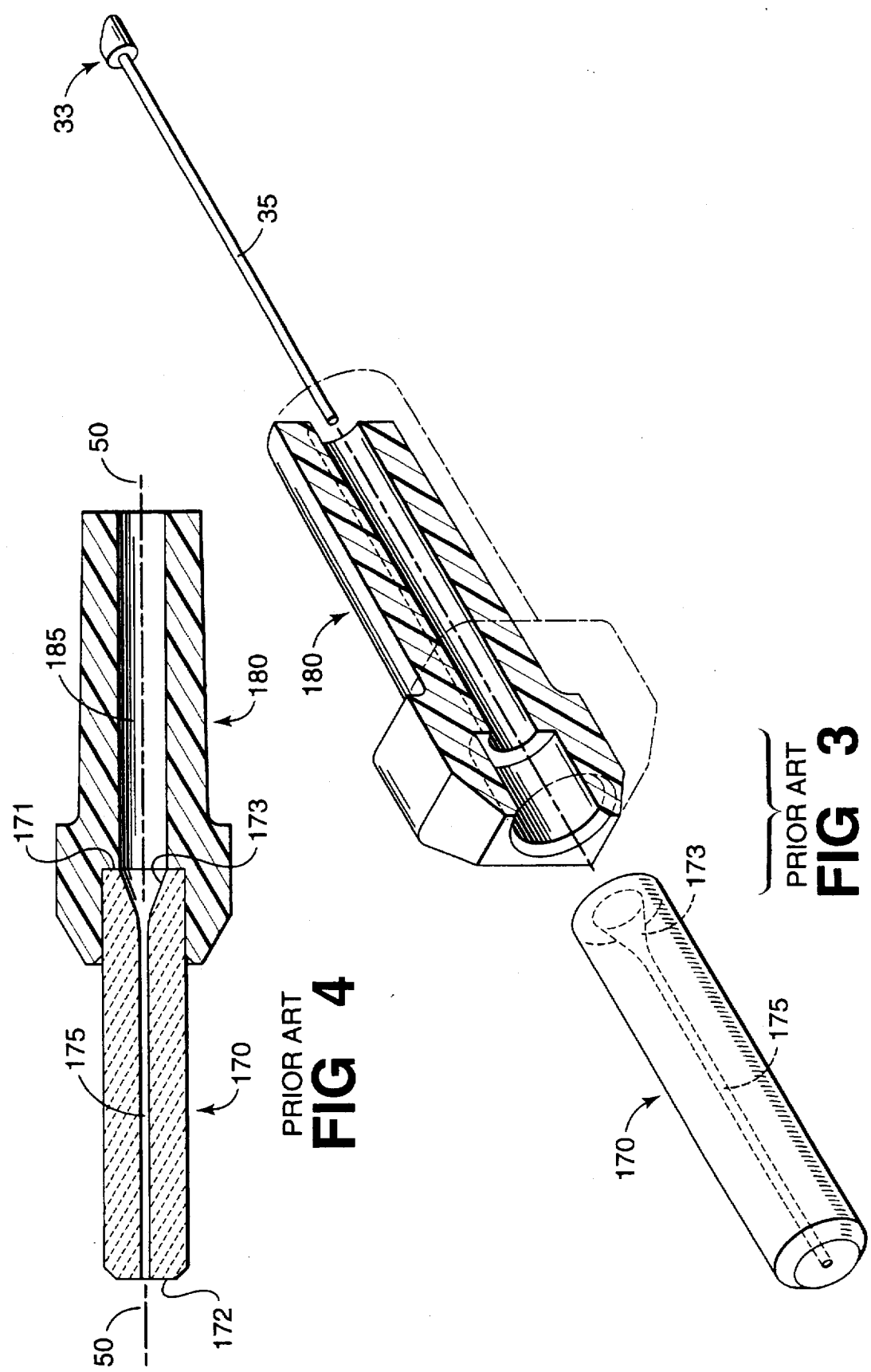

METHOD FOR MANUFACTURING AN OPTICAL CONNECTOR ASSEMBLY

TECHNICAL FIELD

This invention relates to optical connectors, and more particularly to a method and apparatus for manufacturing a connector subassembly comprising a cylindrical ferrule and a base member.

BACKGROUND OF THE INVENTION

Optical fiber connectors are an essential part of substantially any optical fiber communication system. For instance, such connectors may be used to join segments of fiber into longer lengths; to connect fiber to active devices such as radiation sources, detectors and repeaters; or to connect fiber to passive devices such as switches and attenuators. The central function of an optical fiber connector is the maintenance of two optical fiber ends such that the core of one of the fibers is axially aligned with the core of the other fiber; and consequently, all of the light from one fiber is coupled to the other fiber. This is a particularly challenging task because the light-carrying region (core) of an optical fiber is quite small. In singlemode optical fibers the core diameter is about 8 microns where 1 micron=1 µm=$10^{-3}$ mm. Another function of the optical fiber connector is to provide mechanical stability and protection to the junction in its working environment. Achieving low insertion loss in coupling two fibers is generally a function of the alignment of the fiber ends, the width of the gap between the ends, and the optical surface condition of either or both ends. Stability and junction protection is generally a function of connector design (e.g., minimization of the different thermal expansion and mechanical movement effects). An optical fiber connector typically includes a small cylinder with a glass or plastic fiber installed along its central axis.

A variety of connector plugs are known in the art. For a discussion of optical fiber connectors, see, for example, Optical Fiber Telecommunication, S. E. Miller and A. G. Chynoweth, editors, Academic Press (1988), especially pp. 301–325. One of the known connector plugs is referred to as an ST connector and is shown in U.S. Pat. No. 4,934,785. The connector plug comprises a cylindrical ferrule, a base member which holds the ferrule, a compression spring, and a cap that surrounds the ferrule and spring. In this design, only the cylindrical ferrule needs to be of high precision and is typically made from a ceramic material. The cylindrical ferrule is held rigidly in the base member by an adhesive. The ferrule and the base member each include an opening that extends lengthwise from one end to the other. For clarity, these openings will be referred to as a "passageway" when discussing the ferrule, and a "bore" when discussing the base member. The central axis of the passageway and the bore need to be axially aligned—particularly in the region where the ferrule meets the base member so that an optical fiber can be threaded along their common axis. And while manufacturing tolerances may approach "zero," practical considerations such as cost have dictated that axial alignment tolerance be relaxed while still assuring that an optical fiber can pass through the junction where the bore of the base member abuts the passageway of the ferrule. Heretofore, this concern has been handled by designing a fiber entry cone (funnel) in the proximal end of the ferrule where the fiber is inserted. Such a funnel can be produced in a variety of different ways such as by grinding, etching, or fire polishing. However, this is a process that consumes time and resources and ultimately leads to a product having a higher final cost.

What is needed, and what the prior art appears to be lacking, is an apparatus and method for manufacturing an optical connector assembly that includes a ferrule which does not have a funnel in its proximal end.

SUMMARY OF THE INVENTION

An optical connector assembly includes a plastic base member which is overmolded onto a cylindrical ferrule having an axial passageway which extends from one end of the ferrule to the other. The mold comprises a distribution channel for routing plastic material into a base cavity which includes a first slot for holding the cylindrical ferrule, and a second slot for supporting a movable core. An end portion of the ferrule extends into the base cavity. An end portion of the core pin includes a conical tip which also extends into the base cavity and engages the axial passageway of the ferrule. The first and second slots are generally cylindrical and coaxially aligned.

In an illustrative embodiment of the invention, pressurized and heated polycarbonate plastic is used. The core pin is spring loaded to limit the amount of pressure applied to the ferrule. Additionally, a brake is applied to the core pin so that it remains within the axial passageway of the ferrule when the pressurized thermoplastic enters the base cavity and urges the core pin away from the ferrule. Moreover, the thermoplastic material is routed to a brake actuator during molding so that the amount of braking applied to the core pin is proportional to the force tending to move it.

It is an advantage of the present invention that the above-described method and apparatus makes possible the use of a ferrule which does not include a funnel in its proximal end. Furthermore, overmolding also makes it possible to positively interlock the ferrule and base member by including a keyway in the ferrule which is filled by plastic material during molding. Such a keyway precludes the ferrule being pulled out of the base member or from being rotated within the base member.

BRIEF DESCRIPTION OF THE DRAWING

The invention and its mode of operation will be more clearly understood from the following detailed description when read with the appended drawing in which:

FIG. 3 is an exploded perspective view of a prior art ferrule/base member assembly, shown in partial cross section for clarity;

FIG. 4 is a cross section view of the prior art assembly shown in FIG. 3;

DETAILED DESCRIPTION

Figure 1:
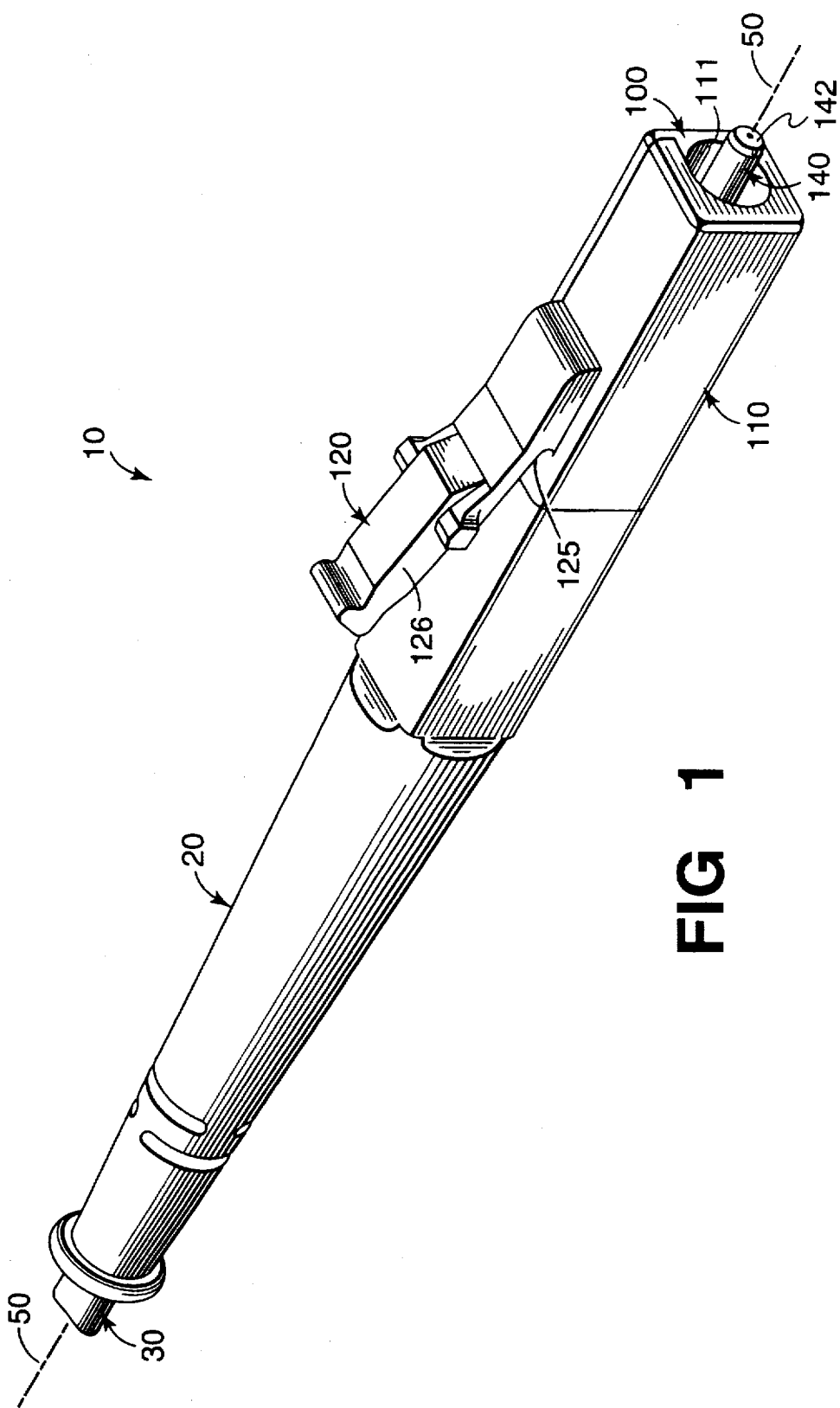
FIG. 1 is a front, top and right-side perspective view of an optical fiber connector.

Reference is made to FIG. 1 which shows a front, top and right-side perspective view of an optical fiber connector 10 which, together with bend-limiting strain-relief boot 20, terminates optical cable 30. This optical fiber connector has a generally rectangular shape with a square cross section. The outside surface of the connector 10 includes a spring latch 120 which is used for securing the connector to an associated receptacle in order to prevent unintended decoupling between the two. The connector and latch are molded from a commodity thermoplastic in order to achieve a low-cost, lightweight housing for optical components contained therein. Spring latch 120 is molded into the housing and includes a "living hinge" 125 which allows tab 126 to be moved up and down in a direction which is perpendicular to the central axis 50—50 of connector 10. The connector has a footprint (cross-section dimension) of 4.6 by 4.6 millimeters (mm). Ferrule 140 is shown protruding from opening 111 of a two-piece assembly comprising housing 110 and cover 100 which have been bonded together after the ferrule 140 and its associated components have been installed in the housing. One of the associated components is a spring which allows the ferrule to move back and forth through the opening 111. An end face 142 of the ferrule comprises a polished flat or domed surface which abuts with the end face of another ferrule in a typical interconnection. The ferrule only protrudes slightly from the front end of the housing in order to protect it from damage if dropped. As will be discussed later, the ferrule may be made from glass which needs greater protection than if made from plastic, metal and/or ceramic materials. Because the connector is small, and preferably uses lightweight materials with a low total mass, there is little fear that the connector (equipped with a glass ferrule) would be damaged if dropped. Using the equation F =ma, force F is proportional to mass m, and in this case the constant a is the acceleration due to gravity.

Figure 2:
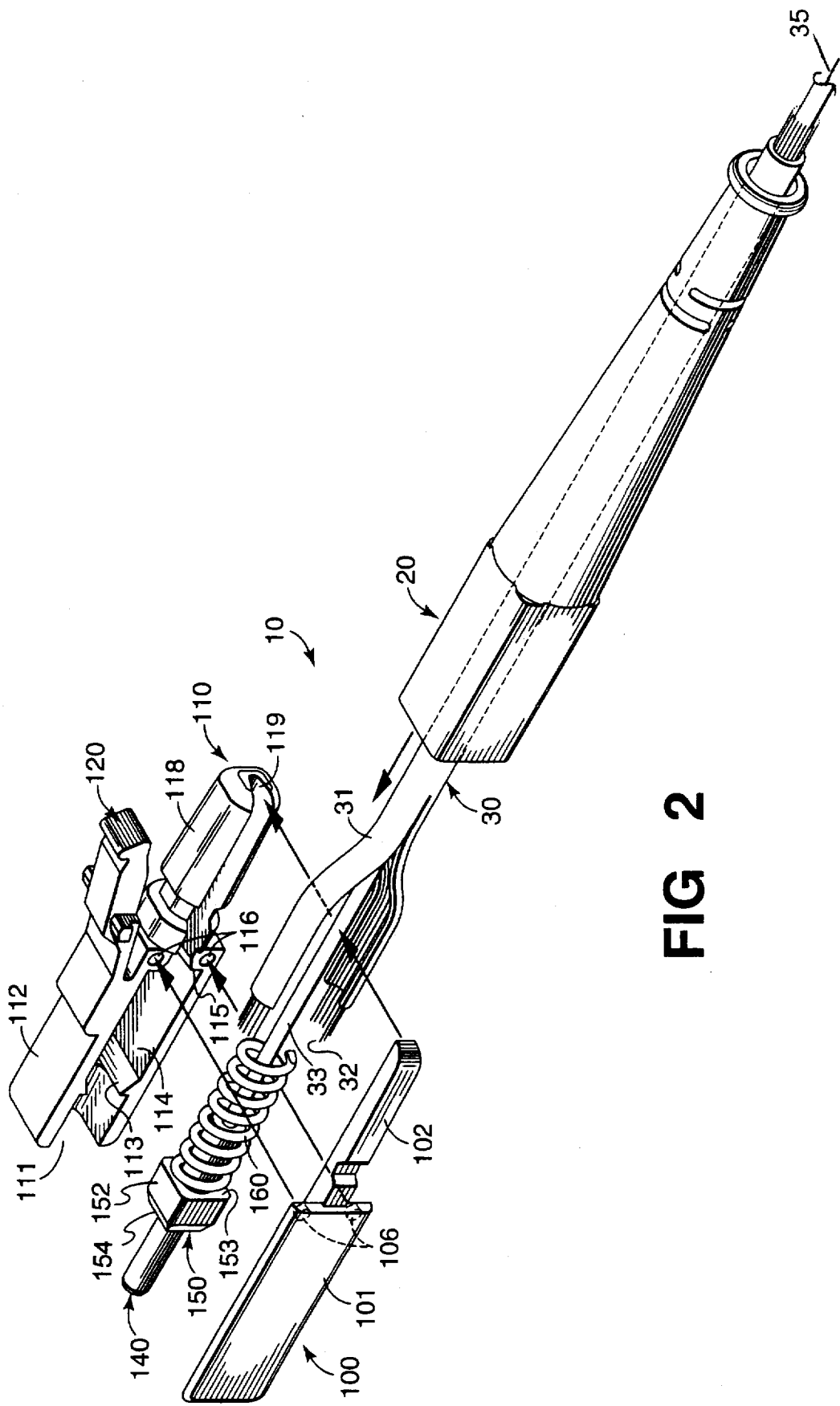
FIG. 2 is an exploded perspective view of the optical fiber connector shown in FIG. 1, illustrating its associated components.

FIG. 2 is an exploded perspective view of the optical connector shown in FIG. 1, illustrating its associated components. In particular, FIG. 2 discloses construction details of a connector 10 which includes housing 110, cover 100, and a fiber-holding structure comprising ferrule 140, base member 150, and spring 160 which is disposed about the base member. Of particular interest is housing 110 which is a generally U-shaped device having a cavity 114 for receiving the fiber-holding structure. Once the fiber-holding structure is inserted into the cavity of housing 110, cover 100 is bonded thereto. Cover 100 includes pins 106—106 which mate with holes 116—116 in housing 110 for alignment. Top surface 112 and left-side surface 101 comprise two of the four outside surfaces that form the front end of connector 10. The back end of connector 10 is conically shaped with four flat areas, spaced 90° apart, that are used to position the back end of the connector within the front end of strain-relief boot 20. Top surface 118 and left-side surface 102 comprise two of the four flat surfaces at the back end of connector 10. Housing members 100,110 include a plurality of interior surfaces that define cavity 114 which surrounds the fiber-carrying structure. The connector includes a first opening 119 at its back end which receives an optical cable 30 and a second opening 111 at its front end for enabling the end face of the fiber-carrying structure to protrude therethrough. These openings 111, 119 extend into cavity 114 and are positioned at opposite ends of connector 10. Housing members 100, 110 are molded from a thermoplastic material and have been designed to be molded for straight pulls without cams to reduce mold and part costs. It is noted that spring latch 120 is molded into the top surface 112 of the housing 110.

Similar to the outside surface of the connector, interior cavity 114 also has a generally square shape. A flange 113 within housing 110 includes a sloped surface which is shaped to interface with chamfered surface 154 of flange 152 on the base member 150. Moreover, flange 152 is shaped to enable it to be supported within cavity 114 in several different stable positions—each one having a different rotational orientation with respect to the central axis of the fiber-holding structure. Compression spring 160 surrounds the back cylindrical portion of base member 150 and presses against surface 153 of flange 152 (see also FIG. 5) and against surface 115 within the cavity 114 of housing member 110. Spring 160 urges the end face of the fiber-holding structure through opening 111.

Ferrule 140 may be a glass, metal, ceramic or plastic cylinder having an axial passageway (about 0.13 mm in diameter) through its central axis for receiving an uncoated end portion of an optical fiber. In a preferred embodiment of the invention the ferrule is made from a borosilicate glass and has an outer diameter of about 1.25 mm and a length of about 7.0 mm. In the construction of an optical cable 30, a thin (about 0.125 mm diameter) glass fiber 35 (see e.g., FIG. 3) is typically coated with two layers of ultraviolet-curable materials such as a polyurethane polyacrylate for protection. A sheath system surrounds the coated fiber to protect it during handling and from environmental conditions. The sheath system may include any or all of the following items. For example, the coated fiber may be covered with a thermoplastic material having sufficient stiffness to preclude fiber buckling thereby forming a buffered fiber 33. Strength members 32 may surround the buffered fiber 33 so that it can withstand tensile forces that might otherwise fracture it. Elongated slender polymeric fibers of high tensile strength, such as aramid yarn, are suitable for use in this regard. An outer jacket 31 comprising polyvinyl chloride, for example, generally surrounds the buffered fiber and strength members to complete the construction of the optical cable.

These layers of different materials, including the two layers of ultraviolet-curable materials, are all stripped from an end portion of the glass fiber prior to its insertion into ferrule 140. An adhesive is injected into the passageway through the central axis of ferrule 140. Then the uncoated end portion of the optical fiber is inserted into the passageway and adhesively attached. Spring 160 is pre-compressed on the ferrule/base member assembly 140/150 with cable, and is placed into housing 110. Housing cover 100 is then installed and ultrasonically bonded. Both the cable jacket 31 and the strength members 32 are "sandwiched" between the boot and the back end of connector 10. When an axial pull of 6.8 kgf is applied to cable 30, it is desirable that it remain attached to connector 10. A suitable material for adhering the strength members to the strain-relief boot and the connector is Hysol 151—a commercially available, two-part epoxy.

FIG. 3 is an exploded perspective view of a prior art ferrule/base member assembly which is shown in partial cross section for clarity. All coating materials are removed from buffered fiber 33 in preparation for its insertion into ferrule/base member assembly 170/180. However, the ferrule 170 and base member 180 are typically joined by an adhesive which undesirably enters funnel 173, during subassembly, and precludes the uncoated end portion 35 from entering passageway 175. As the components are reduced in size, the adhesive can frequently enter funnel 173. Accordingly, this prior art assembly process adds significantly to the overall ferrule/base member cost and needs improvement.

FIG. 4 is a cross section of the prior art ferrule/base member assembly shown in FIG. 3. Ferrule 170 includes a narrow passageway 175 along its central axis 50—50 which extends from its front end face 172 to its back end face 171. In particular, end face 171 is not identical to end face 172 because it includes an entry funnel 173 into the passageway. Such an entry funnel is required in the prior art to guide an optical fiber, with little clearance (typically less than 1 µm for singlemode) into the passageway 175. Manufacturing an entry funnel into the ferrule is an expensive step. In the situation where the ferrule is made from glass, the entry funnel is etched; and in the situation where the ferrule is made from ceramic material, the entry funnel is formed by grinding—and both are relatively expensive steps. Base member 180 includes an axial bore 185 for receiving the optical fiber which must be coaxial with the ferrule after assembly in which the base member and ferrule are joined by press fitting or adhesive means. Manufacturing the ferrule/base member assembly can therefore be a bottleneck. Exemplary approximate dimensions of conventional ferrules are 2.5 mm outside diameter; 0.13 mm axial passageway diameter; and 12.5 mm length.

In the preferred embodiment of the invention, the exemplary approximate dimensions are 1.25 mm outside diameter; 0.13 mm axial passageway diameter; and 7.0 mm length. It is noted that assembly become more difficult as the outside ferrule diameter becomes smaller.

Figure 5:
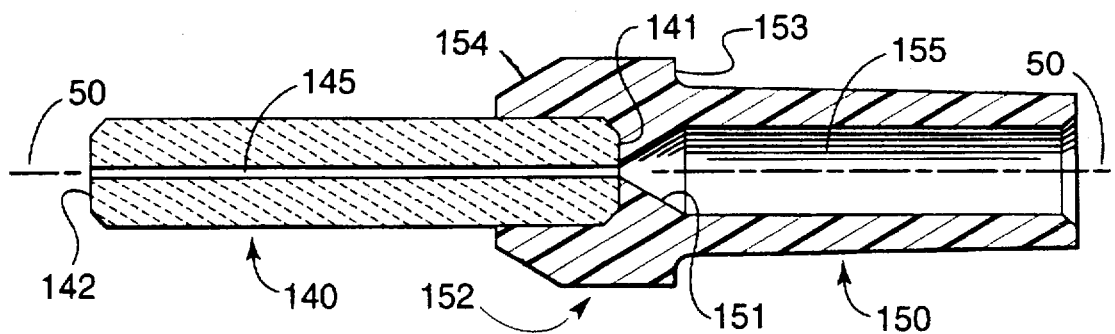
FIG. 5 is a cross section of a ferrule/base member assembly in accordance with the invention.

FIG. 5 illustrates a ferrule/base member assembly comprising ferrule 140 and base member 150 in accordance with the invention. Ferrule 140 includes a narrow cylindrical passageway 145 along its central axis 50—50 which extends from its front end face 142 to its back end face 141. In particular, end face 141 is similar to end face 142 in that it does not include an entry funnel into the passageway; and so, passageway 145 has a substantially constant diameter along its entire length (i.e., from end face 141 to end face 142). Note that base member 150 includes an axial bore 155 having an entry funnel 151 where the axial bore meets the end face 141 of ferrule 140. The ferrule and base member may be press fitted together; however, this is a relatively expensive process due to the required accuracy. In the preferred embodiment of the invention, base member 150 is overmolded onto ferrule 140 as discussed below.

Although not required in the practice of the present invention, the use of a drawn glass ferrule has certain advantages. The high hardness and strength of ceramic materials, which are typically used for making ferrules, are not required. Indeed, due to the relatively soft nature of the glass ferrule (which frequently is softer than the $SiO_2$-based fiber held therein), standard polishing of the ferrule end face typically results in a slightly convex ferrule end face, with possibly a slightly (on a microscopic scale) protruding fiber. This naturally occurring configuration makes possible very efficient fiber coupling. Not only does the resulting intimate fiber-to-fiber contact result in low optical loss, but these connectors also have exceptionally low reflection of signal radiation. Reflection levels lower than −55 dB are commonly observed in prototypical connectors, and low reflection levels are desirable. On the other hand, standard polishing of the relatively hard ceramic ferrule end faces (with an optical fiber held in the ferrule) typically results in preferential removal of material from the fiber such that the fiber end face frequently becomes slightly concave. This in turn results in relatively poor coupling between fibers. Furthermore, the relatively hard debris from the polishing of the ceramic ferrule end face frequently damages the fiber end face. Moreover drawn glass ferrules are less expensive than ceramic ferrules, and can result in connectors that have better thermal properties and dimensional tolerances.

Figure 6:
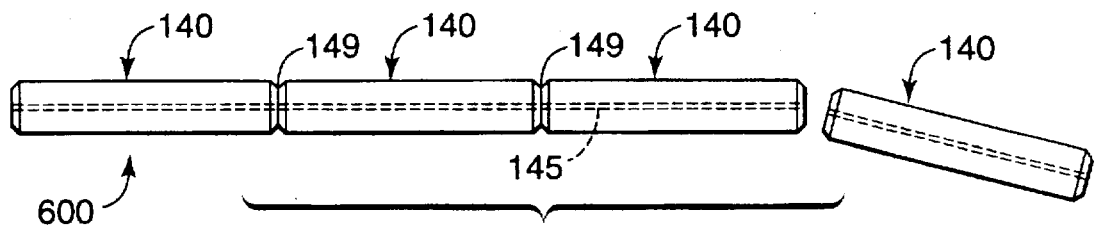
FIG. 6 shows a drawn glass tube having an axial passageway and circumferential scores.

FIG. 6 shows a drawn glass tube 600 having a passageway 145 along its central axis, and circumferential scores 149—149 that facilitate breaking. And although the scores are shown to be symmetrically beveled, it is not necessary. Using the draw process to manufacture ferrules 140—140 is substantially the same as the draw process used in making optical fiber. This process provides a highly accurate end product whose cross-section dimensions are exactly proportional to the much larger tube from which it was drawn. Accordingly, making smaller diameter ferrules than have been conventionally used is not a problem when glass is used.

Figure 7:
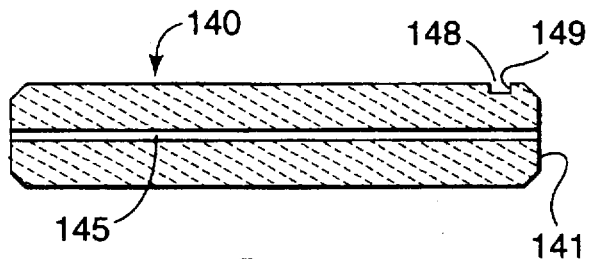
FIG. 7 shows a ferrule, in cross section, having a uniform axial passageway along its entire length and a keyway on its surface.

FIG. 7 shows a ferrule 140 having a uniform axial passageway 145 along its entire length and a keyway 148 on its surface. This keyway may have virtually any shape, although it is shown here as being a flat notch which is positioned near the back end face 141 of the ferrule through which an uncoated end portion of an optical fiber is inserted into passageway 145. The keyway needs to be located in that portion of the ferrule which resides within the base member after molding in order to preclude rotational movement of the ferrule. In the situation where the ferrule is pressed into the base member, the keyway 148 is positioned directly at the end face 141. However, in the preferred embodiment of the invention (i.e., the base member is overmolded onto the ferrule), the keyway 148 is positioned a short distance away from the end face 141 so that, advantageously, a forward-facing surface 149 is available to keep the ferrule from being pulled out of the base member.

Figure 8:
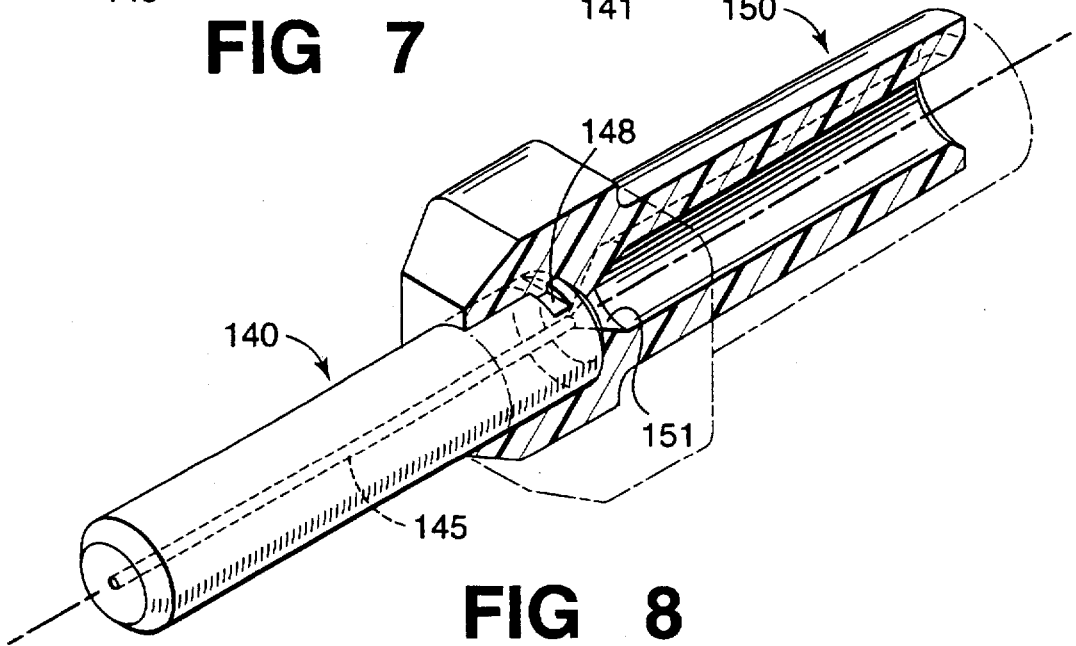
FIG. 8 is a perspective view of a ferrule/base member assembly in accordance with the invention, shown in partial cross section for clarity.

Referring now to FIG. 8, there is disclosed an exploded perspective view of a ferrule/base member assembly in accordance with the invention. In particular, note that the overmolding process causes a small amount of thermoplastic material to fill keyway 148 thereby keeping the ferrule 140 and base member 150 permanently joined in a particular alignment. Moreover, the base member includes a molded funnel 151 which feeds fiber directly into passageway 145 of the ferrule so that the substantial expense and time required to etch or grind a funnel into the ferrule is eliminated. The molding process by which this is achieved is now described in connection with FIG. 9.

Figure 9:
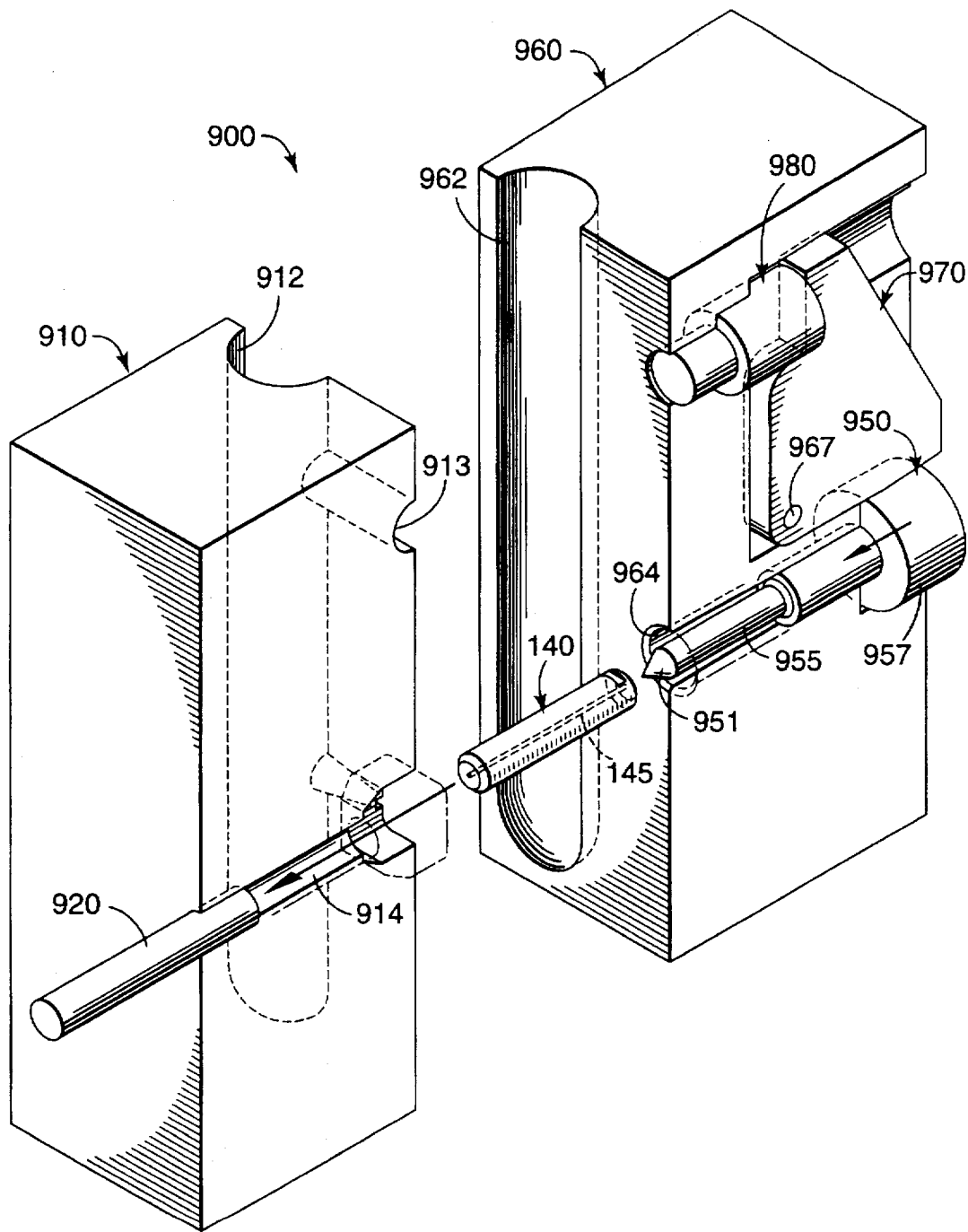
FIG. 9 is an exploded perspective view of a mold, in partial cross section, suitable for overmolding a base member onto a ferrule.

A mold 900 which is suitable for overmolding a base member onto a glass or ceramic ferrule is shown in FIG. 9 in an exploded perspective cross section view. Mold 900 is a tool steel block comprising portions 910 and 960 which are closed during the molding process. Prior to closing the mold, however, a ferrule 140 is inserted into a channel 914 up to ejector pin 920 within mold portion 910. When the mold is closed, channel 914 is coaxial with channel 964 within mold portion 960. Of particular interest is core pin 950, which resides in channel 964. The core pin is made from hardened steel and has a sharp conical point 951 at one end thereof. Illustratively, the conical point has a 60 degree included angle which engages end face 141 (not shown) of ferrule 140 by entering axial passageway 145 as the two mold halves come together. As the mold is closed, the ferrule 140 is positioned against the conical point 951 of core pin 950. To prevent damage to the ferrule, the core pin is spring loaded and allows a minimum of about 0.1 mm of axial movement. Ceramic ferrules are able to withstand a greater force from the spring-loaded core pin, before breaking, than glass ferrules. Illustratively, a spring force of 4.5 kgf is used when overmolding a ceramic ferrule, and a spring force of about 1.4 kgf is used when overmolding a glass ferrule.

After the mold is closed, pressurized and heated thermoplastic material is injected into a channel formed by semicircular grooves 912, 962. Illustratively, polycarbonate plastic is used which is heated to approximately 200° C. and pressurized in the range 3.5–14 kgf/mm$^2$. The mold itself is maintained at about 93° C. so that it takes about 10–12 seconds for the polycarbonate plastic to cool sufficiently before opening the mold. It is noted that the shape of the base member corresponds to the open space within channel 964. For example, the axial bore 155 (see FIG. 5) in the base member 150 has the shape of that portion of the core pin designated 955; and the entry funnel 151 at one end of the axial bore has the shape of that portion of the core pin designated 951.

Figure 10:
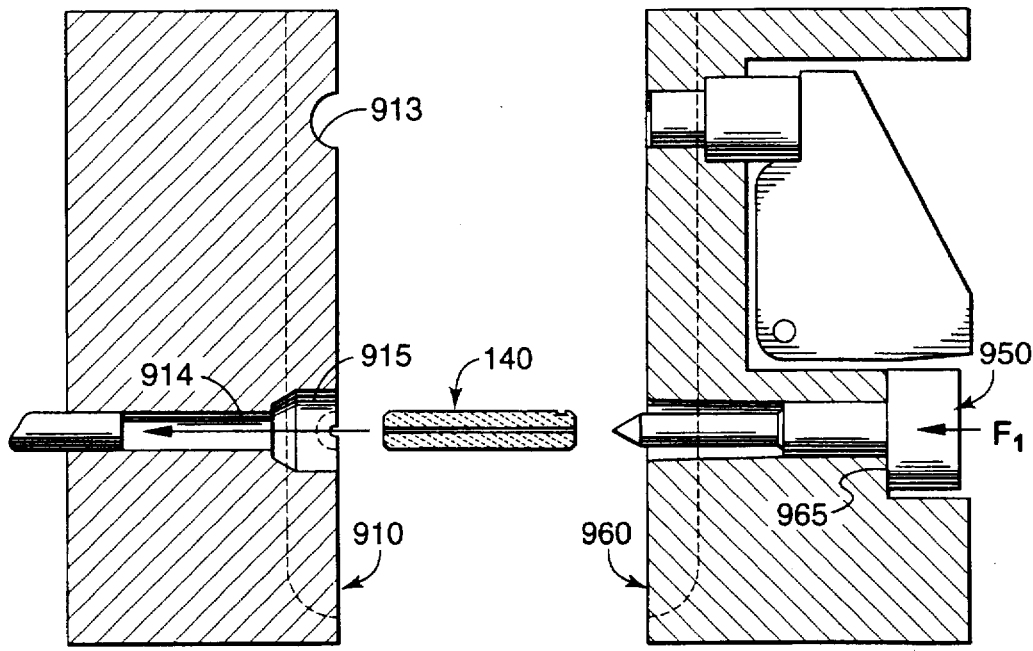
FIG. 10 is a cross-section view of the mold disclosed in FIG. 9, shown in its open position.

As was indicated above, only about 1.4 kgf of spring loading are applied when glass ferrules are used, and this is generally insufficient to prevent the pressurized thermoplastic material from moving core pin 950 (particularly its conical point 951) away from the ferrule and oozing into passageway 145 of the ferrule. One way to eliminate this problem is to lock the core pin in place after the mold is closed and the ferrule has come into contact with the core pin. At this time, the core pin is exerting a force against the ferrule which is equal to the spring loading applied to the core pin. As shown in FIG. 10, "F" represents the force applied to core pin 950 by a spring which, itself, is not shown. So that the thermoplastic material does not move the core pin away from the ferrule, the pressure of the thermoplastic material itself is used to lock the core pin in place. This is accomplished by directing the pressurized thermoplastic material into a channel formed by semicircular groove 913 so that it presses against actuator 980. The actuator transfers this force to lever (brake) 970 which rotates around pivot pin 967 and presses against surface 957 of the core pin 950 to provide a braking force which keeps it stationary. Advantageously, the braking force is proportional to the force which tends to move the core pin. Although automatic locking of the core pin has been described, locking can also be done manually or by an electrically actuated device (e.g., a solenoid).

Figure 11:
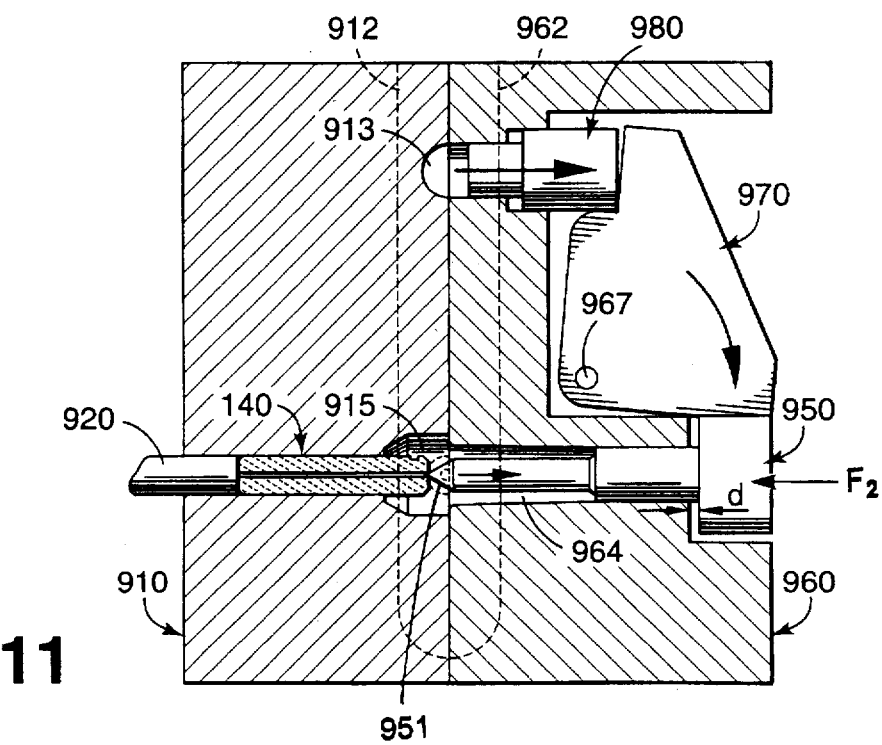
FIG. 11 is a cross-section view of the mold disclosed in FIG. 9, shown in its closed position.

FIGS. 10 and 11 are cross-section views of the mold shown in FIG. 9 in the open and closed positions respectively. Ferrule 140 is installed into channel 914 of mold portion 910 while the mold is open. A force, designated "F$_1$" in FIG. 10, is applied by a spring (not shown) against core pin 950 which holds it against wall 965 of the mold portion 960. The amount of force applied needs to be appropriate for the material used in the manufacture of the ferrule. The mold is then closed and ferrule 140 comes into contact with the tip 954 of core pin 950—thereby causing the core pin to move away from wall 965 by a distance "d," increasing the force to "F$_2$". High pressure thermoplastic material is then injected into the channels formed by grooves 912, 962, 913 causing: (i) actuator 980 to press against brake 970; (ii) brake 970 to rotate around pivot 967 thereby engaging and locking core pin 950; and (iii) thermoplastic material to enter channels 915, 964 and form a structure (i.e., the base member) around ferrule 140. After a brief cooling period, the mold is opened and ejector pin 920 is moved to eject the finished ferrule/base member assembly from the mold.

Although a particular method has been shown and described, various modifications are possible within the spirit and scope of the invention. These modifications include, but are not limited to, the use of: ceramic, plastic or metal ferrules; different size ferrules; optical fibers made from plastic as well as glass; different key shapes on the ferrule surface that cooperate with the base member to prevent relative movement between the ferrule and base member; and the use of the ferrule/base member assembly in other connector housings such as ST, SC and FC for example. Additionally, materials other than thermoplastics may be used for molding the base member.

We claim:

1. A method for manufacturing an optical connector comprising a base member and a cylindrical ferrule having an axial passageway which extends from one end face of the ferrule to the other, the method including the steps of:

inserting the cylindrical ferrule into a ferrule-holding channel within a mold;

advancing a rigid pin, having a sharp tip at one end thereof, into engagement with the axial passageway of the ferrule, said rigid pin and said ferrule having longitudinal axes which are collinear;

maintaining a predetermined engagement force between the rigid pin and the ferrule by using a spring-loaded rigid pin;

injecting plastic material into the mold to surround an end portion of the ferrule and form the base member; and ejecting the base member and cylindrical ferrule assembly from the mold.

2. The method of claim 1 wherein the base member comprises a thermoplastic material, further including the steps of heating the thermoplastic material to a predetermined temperature prior to injecting it into the mold; and cooling the thermoplastic material within the mold prior to ejecting the base member and cylindrical ferrule assembly from the mold.

3. The method of claim 1 further including the step of restraining the rigid pin from being moved after it engages the ferrule with limited force.

4. The method of claim 3 wherein the step of restraining the rigid pin from being moved comprises the steps of channeling a portion of the injected plastic material to a first section of a movable brake; and moving the brake into frictional engagement with the rigid pin.

5. A method for overmolding a base member onto a ferrule having an axial passageway which extends from one end face of the ferrule to the other, the method comprising the steps of:

inserting the ferrule into a ferrule-holding channel within a mold;

advancing a cylindrical pin, having a cone-shaped tip at one end thereof, into engagement with the axial passageway of the ferrule;

maintaining a predetermined engagement force between the cylindrical pin and the ferrule by using a spring-loaded cylindrical pin;

heating thermoplastic material to a first predetermined temperature so that it will flow under pressure;

injecting the heated thermoplastic material into the mold so that it surrounds an end portion of the ferrule;

cooling the thermoplastic material to a second predetermined temperature; and ejecting the base member and ferrule assembly from the mold.

* * * * *